United States Patent
Wolf et al.

(10) Patent No.: US 11,891,030 B2
(45) Date of Patent: Feb. 6, 2024

(54) MULTI-VEHICLE BRAKING SYSTEM

(71) Applicant: Westinghouse Air Brake Technologies Corporation, Wilmerding, PA (US)

(72) Inventors: Charles L. Wolf, Olney, MD (US); Carl L. Haas, Walkersville, MD (US); Benjamin Henniges, Mount Airy, MD (US); Mark Uehling, Germantown, MD (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 134 days.

(21) Appl. No.: 17/468,773

(22) Filed: Sep. 8, 2021

(65) Prior Publication Data

US 2022/0097665 A1  Mar. 31, 2022

Related U.S. Application Data (60) Provisional application No. 63/085,458, filed on Sep. 30, 2020.

(51) Int. Cl.
*B60T 13/66* (2006.01)
*B60T 17/22* (2006.01)

(52) U.S. Cl.
CPC .......... *B60T 13/665* (2013.01); *B60T 17/228* (2013.01); *B60T 2270/413* (2013.01)

(58) Field of Classification Search
CPC . B60T 13/665; B60T 17/228; B60T 2270/413
See application file for complete search history.

(56) References Cited

U.S. PATENT DOCUMENTS

| | | | |
|---|---|---|---|
| 5,967,620 A | 10/1999 | Truglio et al. | |
| 6,024,419 A | 2/2000 | Waldrop et al. | |
| 6,189,980 B1 * | 2/2001 | Kull | B60T 13/665 303/7 |

(Continued)

FOREIGN PATENT DOCUMENTS

| | | |
|---|---|---|
| CH | 625752 A5 | 10/1981 |
| DE | 2306686 A1 | 8/1974 |

(Continued)

OTHER PUBLICATIONS

Office Action dated Jan. 20, 2023 for corresponding Canadian Patent Application No. 3,130,383 (3 pages).

(Continued)

*Primary Examiner* — Vishal R Sahni
(74) *Attorney, Agent, or Firm* — The Small Patent Law Group LLC; Christopher R. Carroll (57) ABSTRACT

A braking system conducts an electronic command signal via a cable extending through multiple first vehicles in a first segment of a multi-vehicle system. The electronic command signal directs engagement or release of an air brake coupled to a brake pipe that extends along a length of the multi-vehicle system. A pneumatic command signal is communicated via the brake pipe to one or more second vehicles in a second segment of the multi-vehicle system. The pneumatic command signal directs one or more of the engagement or the release of the air brake coupled to the brake pipe in the one or more second vehicles.

15 Claims, 2 Drawing Sheets

(56) References Cited

U.S. PATENT DOCUMENTS

| | | | |
|---|---|---|---|
| 6,435,624 B1* | 8/2002 | Kull | B60T 13/665 |
| | | | 303/3 |
| 2008/0053331 A1* | 3/2008 | Marra | B60T 17/228 |
| | | | 105/26.05 |
| 2013/0297163 A1* | 11/2013 | Kull | B60T 17/228 |
| | | | 701/70 |
| 2016/0375888 A1* | 12/2016 | Allwardt | B60T 17/221 |
| | | | 701/19 |
| 2017/0232943 A1 | 8/2017 | Brooks et al. | |
| 2019/0168728 A1* | 6/2019 | Venkatasubramanian | |
| | | | B60T 13/665 |
| 2019/0276055 A1* | 9/2019 | Cooper | B60L 15/34 |
| 2019/0344764 A1* | 11/2019 | Kernwein | B60T 15/021 |
| 2021/0188223 A1* | 6/2021 | Rossmann | B60T 17/228 |
| 2021/0323590 A1* | 10/2021 | Haas | B61L 15/0027 |

FOREIGN PATENT DOCUMENTS

| | | |
|---|---|---|
| EP | 0335532 A1 | 10/1989 |
| WO | 2010133453 A1 | 11/2010 |

OTHER PUBLICATIONS

First Examination Report dated Apr. 7, 2022 for corresponding Indian Patent Application No. 202114041725 (5 pages).
First Examination Report dated Feb. 1, 2023 for corresponding Australian Patent Application 2021240159 (5 pages).
Requisition by the Examiner for corresponding CA Application No. 3,123,421 dated Jul. 14, 2023 (4 pages).

* cited by examiner

MULTI-VEHICLE BRAKING SYSTEM

CROSS-REFERENCE TO RELATED APPLICATIONS

This application claims priority to U.S. Patent Application No. 63/085,458, which was filed on 30 Sep. 2020, and the entire disclosure of which is incorporated herein by reference.

BACKGROUND

Technical Field

The subject matter described herein relates to braking systems for multi-vehicle systems.

Discussion of Art

Some known multi-vehicle systems rely on changes in fluid pressure to engage or release brakes of the vehicle systems. For example, rail vehicle systems can use changes in air pressure in a brake pipe to control the application or release of air brakes along the length of the rail vehicle system. Pneumatic valves can be used to control brake applications on the rail vehicles along the length of the rail vehicle system. The brake pipe extends the length of the vehicle system and supplies air to reservoirs in the vehicles. When the brake pipe and reservoirs are pressurized with air, the brakes in the vehicles are released. To engage the brakes, the pressure in the brake pipe is reduced. This causes a service portion of each of the vehicles to direct air from the reservoir of that vehicle to a brake cylinder of that vehicle to engage the brake.

The time at which different brakes along the vehicle system engage or release can be delayed, however, due to the time needed for changes in the brake pipe pressure to propagate along the length of the brake pipe (and the length of the vehicle system). Consequently, different segments of the vehicle system may brake differently at the same time. This can cause increases in inter-vehicle forces within the vehicle system.

One known solution to the problems caused by this propagation delay is an electronically controlled pneumatic (ECP) brake system. The ECP brake system relies on electronic signals that are communicated via a cable (e.g., a trainline cable) that extends through the vehicles in the vehicle system. This cable is used to communicate brake commands. For example, a lead vehicle in the vehicle system can electronically communicate a brake command to ECP devices onboard other vehicles in the vehicle system via the trainline cable. Response to receiving a brake command, the ECP devices can engage the air brakes (e.g., by increasing the pressure within the brake cylinder in the vehicle portion of the brake system). Communicating brake commands electronically instead of pneumatically can allow for brake commands to be more rapidly implemented. This can allow for a more even application of brakes along the entire length of a multi-vehicle system.

But the transition from pneumatic control to ECP control of an air brake system may not occur until an entire fleet of vehicles is upgraded or otherwise converted to ECP operation. That is, some known operators of rail vehicle systems do not implement ECP operation of air brakes until all rail vehicles in a rail vehicle system have the ECP component parts installed. Having to wait until the final upgrade of the vehicles before obtaining any operational benefits of the ECP system lengthens the duration of the upgrade program and delays the return on investment in the ECP system. This can be an impediment to adoption of the superior ECP technology.

BRIEF DESCRIPTION

In one embodiment, a method includes conducting an electronic command signal via a cable extending through multiple first vehicles in a first segment of a multi-vehicle system. The electronic command signal directs engagement or release of an air brake coupled to a brake pipe that extends along a length of the multi-vehicle system. The method also can include pneumatically communicating a pneumatic command signal via the brake pipe to one or more second vehicles in a second segment of the multi-vehicle system. The pneumatic command signal directs one or more of the engagement or the release of the air brake coupled to the brake pipe in the one or more second vehicles.

In one embodiment, a braking system includes a brake pipe configured to fluidly couple air brakes disposed onboard first vehicles and second vehicles in a multi-vehicle system. The first vehicles are in a first segment and the second vehicles are in a second segment of the multi-vehicle system. The braking system also can include a cable extending through the first vehicles in the first segment of the multi-vehicle system and ECP control devices configured to be disposed onboard one or more of the first vehicles and to control operation of the air brake of the one or more of the first vehicles. The ECP control devices are configured to receive an electronic command signal conducted along the cable that directs engagement or release of the air brake in at least one of the first vehicles. The brake pipe is configured to pneumatically communicate a pneumatic command signal to the second vehicles that directs the engagement or the release of the air brake in the second vehicles.

In one embodiment, a vehicle system includes first vehicles having ECP control devices conductively coupled with each other by a cable. The first vehicles also have air brakes fluidly coupled with a brake pipe. The vehicle system includes second vehicles not having the ECP control devices. The second vehicles have the air brakes that are fluidly coupled with the brake pipe. The ECP control devices in the first vehicles are configured to receive an electronic command signal conducted along the cable that directs engagement or release of the air brakes in the first vehicles. The brake pipe is configured to pneumatically communicate a pneumatic command signal to the second vehicles that directs the engagement or the release of the air brakes in the second vehicles.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to braking systems and methods that combine ECP and/or wired distributed power (WDP)-enabled vehicles with vehicles that are not enabled with ECP and/or WDP (ECP/WDP) in the same multi-vehicle system. The braking systems and methods control the ECP brakes and the pneumatically controlled brakes in such a hybrid brake system. WDP includes the throttle settings and/or brake settings of the propulsion-generating vehicles being controlled by signals electronically communicated along a cable (e.g., the train line).

A lead propulsion-generating vehicle (e.g., a lead locomotive) and one or more non-propulsion-generating vehicles (e.g., rail cars) that have received an ECP equipment upgrade can be coupled in a vehicle system with one or more other non-propulsion-generating vehicles (and/or one or more other propulsion-generating vehicles) that have not received the ECP equipment upgrade. This vehicle system can operate in a partial ECP/WDP mode (e.g., PE mode). This partially upgraded vehicle system can be configured with a lead ECP/WDP-equipped locomotive followed by the ECP-equipped rail cars. Once two or more locomotives have been upgraded with ECP and/or WDP equipment, the vehicle system can be operated in a combined mode. In this mode, the partially upgraded train can be configured with a lead ECP/WDP locomotive followed by segments of ECP-equipped cars and ECP/WDP equipped remote locomotives in various configurations. Cars or locomotives in the vehicle system that have not yet received the ECP upgrade can be physically positioned behind the last wired locomotive or rail car unless outfitted with an ECP bypass cable.

A controller onboard the lead vehicle (e.g., a driver or other operator of the vehicle system) can select to drive the vehicle system in either partial ECP (PE) or trainline distributed power without ECP (TLDP) operation from the lead vehicle. Brake commands can be electronically communicated from the lead vehicle as ECP commands to the ECP-equipped vehicles (e.g., ECP-equipped rail cars). Braking and propulsion commands can be electronically communicated from the lead vehicle as WDP or TLDP commands to the ECP/WDP-equipped or TLDP-equipped propulsion-generating vehicles (e.g., the ECP/WDP-equipped or TLDP-equipped locomotives) via a cable (e.g., the ECP cable). The pressure in brake cylinders can be controlled using ECP commands for the ECP-equipped vehicles. The pressure in the brake cylinders can be pneumatically controlled using reductions or increases in brake pipe pressure for the vehicles that are not equipped with ECP or ECP/WDP equipment to ensure that all vehicles properly respond to the brake commands.

While portions of the description herein relate to rail vehicles (e.g., locomotives, rail cars, and trains), not all embodiments of the inventive subject matter are limited to rail-based vehicles. At least one embodiment of the inventive subject matter may be used in connection with non-rail based vehicles, such as trucks or automobiles relying on fluid pressure to control brakes and that are joined together in a multi-vehicle system.

Figure 1:
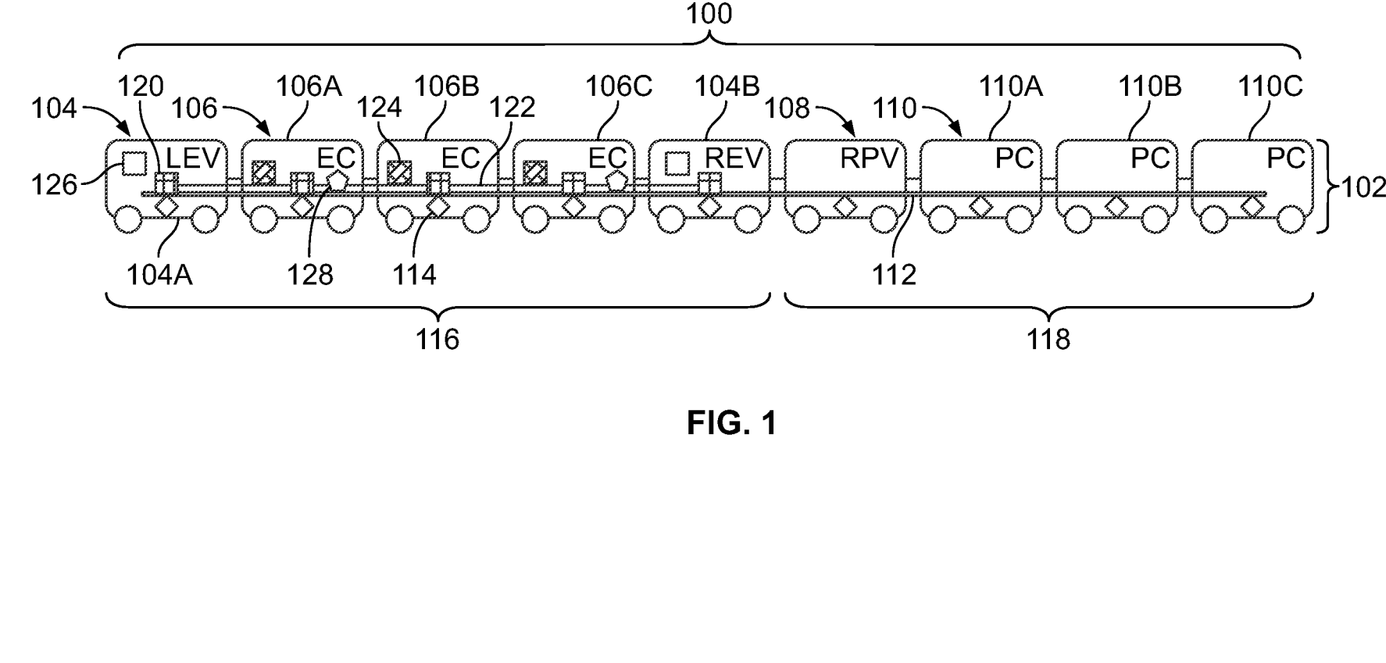
FIG. 1 illustrates one example of a braking system.

FIG. 1 illustrates one example of a braking system 100. The braking system is disposed onboard a multi-vehicle system 102 formed from several vehicles 104, 106, 108, 110. The braking system is a pressurized fluid brake system, such as an air brake system, having a brake pipe 112 extending along the length of the vehicle system through the vehicles. Several brakes 114 are disposed onboard the vehicles and are engaged or released based on changes in pressure in the brakes (e.g., based on changes in air pressure in brake cylinders of the brakes).

The vehicle system includes an ECP-equipped segment 116 and a non-ECP-equipped segment 118. As described below, the ECP-equipped segment includes one or more vehicles having ECP equipment (e.g., ECP control devices 120) onboard the vehicles. These ECP control devices can receive electronic signals communicated via a cable 122 (e.g., a train line or other conductive pathway onboard the vehicle system) and can engage or release the air brakes of the corresponding vehicles based on the signals. Optionally, propulsion-generating vehicles in the ECP-equipped segment can communicate (e.g., send and/or receive) throttle command signals via the cable to direct throttle settings of the propulsion-generating vehicles.

As described below, in one embodiment, the ECP-equipped segment optionally can include one or more vehicles that do not have ECP control devices, but that include part of the cable through which the command signals are communicated to ECP-equipped vehicles. Stated differently, the ECP-equipped segment can include a rail car that does not have the ability to implement commands communicated via the train line to electronically control pneumatic brakes of the rail car, but that includes a bypass cable that connects one or more ECP-equipped vehicles ahead of the rail car with one or more vehicles that are not ECP equipped behind the rail car.

The non-ECP-equipped segment of the vehicle system includes one or more vehicles that do not have ECP control devices onboard the vehicles. These vehicles pneumatically engage and release the brakes of the vehicles based on changes in pressure in the brake pipe. For example, a decrease in air pressure in the brake pipe may propagate along the length of the brake pipe, causing engagement of the air brakes as the pressure reduction moves along the brake pipe.

In the ECP-equipped segment, the vehicles are electrically connected with each other by the cable and fluidly coupled with each other by the brake pipe. The vehicles 104 (e.g., vehicles 104A, 104B) represent propulsion-generating vehicles having the ECP control device. The vehicle 104A can represent a lead locomotive of the vehicle system and the vehicle 104B can represent a remote locomotive of the vehicle system. The vehicle 104A can be referred to as a lead ECP/WDP vehicle (e.g., a Lead ECP Vehicle, or LEV, in FIG. 1) and the vehicle 104B can be referred to as a remote ECP/WDP vehicle (e.g., a Remote ECP Vehicle, or REV, in FIG. 1). One or more additional vehicles 104 can be included in the vehicle system.

The vehicles 106 (e.g., vehicles 106A-C) in the ECP-equipped segment represent non-propulsion-generating vehicles having ECP control devices onboard the vehicles 106. For example, the vehicles 106 can represent rail cars that do not include motors, engines, or the like, which perform work to generate propulsion or torque that moves the vehicles 106 along routes (e.g., tracks, rails, etc.). The vehicles 106 can be referred to as ECP cars (EC in FIG. 1).

In the non-ECP-equipped segment, the vehicles are fluidly coupled with each other by the brake pipe but are not electrically coupled with each other by the cable. Optionally, one or more of the non-ECP-equipped vehicles may include ECP control devices that are not activated, have failed, or otherwise are not controlling pressure in brake cylinders in the corresponding vehicles. As another option, one or more of the non-ECP-equipped vehicles can be a bridge vehicle having a length of cable that couples the portion of the train line in one segment of the vehicle system with another portion of the train line in another segment of the vehicle system, but that does not include an ECP control device.

The vehicles in the ECP-equipped segment can remain fluidly coupled with the vehicles in the non-ECP-equipped segment by the brake pipe. The vehicle 108 represents another propulsion-generating vehicle, but one that does not have an ECP control device onboard the vehicle 108. For example, the vehicle 108 can represent a remote locomotive of the vehicle system that does not have the ECP control device. The vehicle 108 can be referred to as a remote non-ECP vehicle (or Remote Pneumatic Vehicle, or RPV, in FIG. 1). One or more additional vehicles 108 can be included in the vehicle system. For example, one or more additional locomotives not having the ECP equipment onboard may be in the vehicle system, such as between the vehicle 108. These additional vehicles 104 can be referred to as remote non-ECP/WDP vehicles.

The vehicles 110 (e.g., vehicles 110A-C) in the non-ECP-equipped segment represent non-propulsion-generating vehicles that do not have ECP control devices onboard the vehicles 110. For example, the vehicles 110 can represent rail cars that do not have ECP control devices. The vehicles 110 can be referred to as non-ECP cars or Pneumatic Cars (PC) in FIG. 1.

The ECP control devices represents hardware circuitry that includes one or more processors (e.g., one or more microcontrollers, one or more field programmable gate arrays, one or more integrated circuits, one or more microprocessors, or the like) that control pressure in a brake cylinder onboard the corresponding vehicle based on receipt of an electronic signal communicated via the cable. For example, responsive to receiving a brake command signal at a receiving vehicle via the cable from the lead vehicle, the ECP control device can reduce air pressure in a brake cylinder of the brake in the receiving vehicle.

In one embodiment, one or more of the vehicles can include output devices 124 that communicate information to another vehicle in the vehicle system, such as the lead ECP/WDP vehicle 104. Alternatively, the output devices can communicate information to another vehicle. The output devices can represent sensors, modems, transceiving equipment, or the like, which generates and/or receives electronic signals via the cable. The output devices can include one or more pressure sensors that output signals indicative of measured pressures in the braking system. For example, an output devices can represent one or more pressure sensors that communicate electronic signals to the lead ECP/WDP vehicle via the cable, with the signals indicating the pressure of air in the brake pipe, the pressure of air in the brake cylinder, the pressure of air in one or more reservoirs, or the like, in the corresponding vehicle. As other examples, the output devices can include temperature sensors, infrared sensors, accelerometers, or the like, that output signals indicative of vehicle temperatures, bearing temperatures, states of doors (open or closed), states of actuators, refrigeration faults, or the like.

Optionally, one or more of the vehicles may include a manually actuated brake 128, such as a handbrake. The manually actuated brake can include or be coupled with a sensor that generates electronic signals to indicate a state of the manually actuated brake. For example, the sensor of the manually actuated brake can output an electronic signal that is communicated via the cable to the controller onboard the lead ECP/WDP vehicle. This signal can indicate whether the manually actuated brake is engaged or released.

During operation or movement of the vehicle system, the output devices can communicate the signals to the lead ECP/WDP vehicle (e.g., in real time) to allow for a controller 126 onboard the lead ECP/WDP vehicle to monitor operation of the braking system. The controller onboard the lead ECP/WDP vehicle represents hardware circuitry that includes and/or is connected with one or more processors that can monitor operation of the vehicle system. For example, the controller can receive the signals from the output devices and/or sensors of the manually actuated brakes to determine the operational state of the vehicle system and/or vehicles within the vehicle system. Optionally, the controller can change operation of the vehicle system based on these signals. For example, the controller can automatically engage or release brakes based on the signals (e.g., by preventing movement of the vehicle system while a handbrake is engaged, while a bearing temperature is too hot, etc.).

In operation, the vehicle system may be formed or built with the ECP-equipped vehicles in the front or leading end of the vehicle system and the non-ECP-equipped vehicles in the rear or trailing end of the vehicle system. Optionally, one or more ECP-equipped vehicles may be included in the non-ECP-equipped segment of the vehicle system, but the ECP control devices in those vehicles may remain turned off or otherwise deactivated. All vehicles in the vehicle system are fluidly coupled with the brake pipe, but only those vehicles in the ECP-equipped segment may be electrically or conductively coupled with each other by the cable (although cable connections other than the ECP cable or train line may be provided between or among the vehicles).

The controller or ECP control device onboard the lead ECP/WDP vehicle can send an activation or "wake up" command signal to the ECP control devices within the vehicle of the ECP-equipped segment. This command signal can be conducted to the ECP control devices via the cable. While the non-ECP-equipped segment may include one or more vehicles having an ECP control device (e.g., there may be one or more ECP-equipped vehicles within the non-ECP-equipped segment), the ECP control devices onboard these vehicles may not activate.

During operation, the lead ECP/WDP vehicle issues brake commands to the other ECP-equipped vehicles via the cable to engage the brakes within the vehicles of the ECP-equipped segment. The controller 126 onboard the lead ECP/WDP vehicle 104 can send propulsion and/or braking commands via the cable 122. For example, the controller 126 can send electronic brake command signals via, through, or over the cable 122 to the ECP control devices 120 of the vehicles having the ECP control devices 120 in the ECP-equipped segment 116. The ECP control devices that receive a brake command can reduce the pressure in the brake cylinder onboard the corresponding vehicle to engage the brake.

The lead ECP/WDP vehicle can direct the brakes in the non-ECP-equipped segment of the vehicle system to engage by propagating a pressure reduction via the brake pipe to the vehicles in the non-ECP-equipped segment. In order to coordinate braking in the non-ECP-equipped segment with braking in one or more vehicles in the ECP-equipped segment, the controller onboard the lead ECP/WDP vehicle can send a propagation command to the controller onboard the remote ECP vehicle (e.g., the last remote ECP vehicle in the ECP-equipped segment). This propagation command can direct the remote ECP vehicle to reduce the pressure within the brake pipe at the remote ECP vehicle. As a result, the brake pipe in the remote ECP vehicle can be vented (e.g., to the atmosphere) to initiate a pressure reduction in the brake pipe. Because the brake pipe continuously extends the entire length of the vehicle system in at least one embodiment, the remote ECP vehicle may not be able to independently initiate this pressure reduction without the lead ECP/WDP vehicle also initiating the pressure reduction in the lead ECP/WDP vehicle. The brake pipe pressure reduction can therefore be initiated at both the lead ECP/WDP vehicle and the remote ECP vehicle. This can cause the brake pipe pressure reduction to begin propagating through the brake pipe in the non-ECP-equipped segment and reach vehicles in the non-ECP-equipped segment faster than if the brake pipe pressure reduction began only at the lead ECP/WDP vehicle. This can be implemented to control the rate at which the pressure reduction propagates through the brake pipe in the non-ECP-equipped segment of the vehicle system.

As one example, instead of reducing the pressure in the brake pipe at the lead ECP/WDP vehicle and waiting for this pressure reduction to propagate along the length of the brake pipe through the vehicle 104A, then the vehicle 106A, then the vehicle 106B, and so on, the lead ECP/WDP vehicle can direct the last remote ECP vehicle in the ECP-equipped segment to vent the brake pipe concurrently with the lead ECP/WDP vehicle also venting the pressure in the brake pipe. This can cause the reduction in pressure in the brake pipe to begin at both the lead ECP/WDP vehicle and the last remote ECP vehicle in the ECP-equipped segment, and reach the vehicles in the non-ECP-equipped segment of the vehicle system faster than if the brake pipe was vented only in the lead ECP/WDP vehicle in the ECP-equipped segment. The lead ECP/WDP vehicle also can direct the ECP control devices in the ECP-equipped segment to locally reduce pressure in the brake cylinders of the ECP-equipped vehicles in the ECP-equipped segment. Directing the ECP control devices in the ECP-equipped segment to locally reduce pressure in the brake cylinders and directing the last remote ECP vehicle to begin propagation of a pressure reduction in the brake pipe through the non-ECP-equipped segment can allow the brakes along the entire length of the vehicle system to slow down more quickly or stop movement of the vehicle system.

The lead ECP/WDP vehicle also can control how rapidly brakes are released or engaged along the entire length of the vehicle system. For example, the lead ECP/WDP vehicle can control the vehicle system in an ECP mode that includes increasing the pressure in the brake pipe in coordination with brake commands electronically conducted via the cable. Stated differently, instead of increasing the pressure in the brake pipe at the lead ECP/WDP vehicle and waiting for this pressure increase to propagate along the length of the brake pipe through the vehicle 104A, then the vehicle 106A, then the vehicle 106B, and so on, the lead ECP/WDP vehicle can direct the last remote ECP vehicle in the ECP-equipped segment to increase the pressure in the brake pipe. This can cause the increase in pressure to begin at or following the last remote ECP vehicle and reach the vehicles in the non-ECP-equipped segment of the vehicle system faster (than if the lead vehicle in the ECP-equipped segment initiated the pressure increase in the brake pipe. The lead ECP/WDP vehicle also can direct the ECP control devices in the ECP-equipped segment to locally exhaust the pressure in the brake cylinders of the ECP-equipped vehicles in the ECP-equipped segment. Directing the ECP control devices in the ECP-equipped segment to exhaust the pressure in the brake cylinders and directing the remote ECP vehicle to begin propagation of a pressure increase in the brake pipe through the non-ECP-equipped segment (beginning at the last ECP vehicle in the ECP-equipped segment) can allow the brakes along the entire length of the vehicle system to be released more rapidly.

The controller 126 onboard the lead ECP/WDP vehicle optionally can send other movement commands (such as throttle commands or settings, dynamic brake commands or settings, etc.) as electronic signals via, through, or over the cable 122 to the controller 126 onboard the remote ECP vehicle(s) to remotely control the propulsion and/or braking of the remote ECP vehicle(s). For example, the controller of the lead ECP/WDP vehicle can send throttle commands that direct which throttle setting that a remote propulsion-generating vehicle (e.g., the vehicle 104B) is to use, dynamic brake commands that direct the retardation effort to be generated by dynamic braking using motors of the remote propulsion-generating vehicle (e.g., the vehicle 104B), etc.

Other vehicles within the ECP-equipped segment can report statuses of the vehicles via signals sent via the cable. For example, the output devices of the vehicles in the ECP-equipped segment can send status signals to the controller of the lead ECP/WDP vehicle via the cable, with the signals reporting temperatures, pressures, statuses, failures, or the like, as described above. The controller can examine these signals and notify an operator of the information (e.g., via information shown on an electronic display, audibly presented via a speaker, or the like). Optionally, the controller can automatically implement one or more changes in movement of the vehicle system, such as by automatically sending electronic signals and/or changes in pressure in the brake pipe, based on the signals. For example, the controller can automatically engage brakes based on an elevated temperature being detected, a manually actuated brake reported as being engaged, or the like.

In one embodiment, the controller onboard the lead ECP/WDP vehicle can remotely control one or more of the manually actuated brakes onboard a vehicle in the ECP-equipped segment of the vehicle system. For example, the controller can send a control signal via the cable 122 to one or more of the manually actuated brakes to direct the manually actuated brake(s) to release or engage without an operator having to manually release or engage the brake(s).

Figure 2:
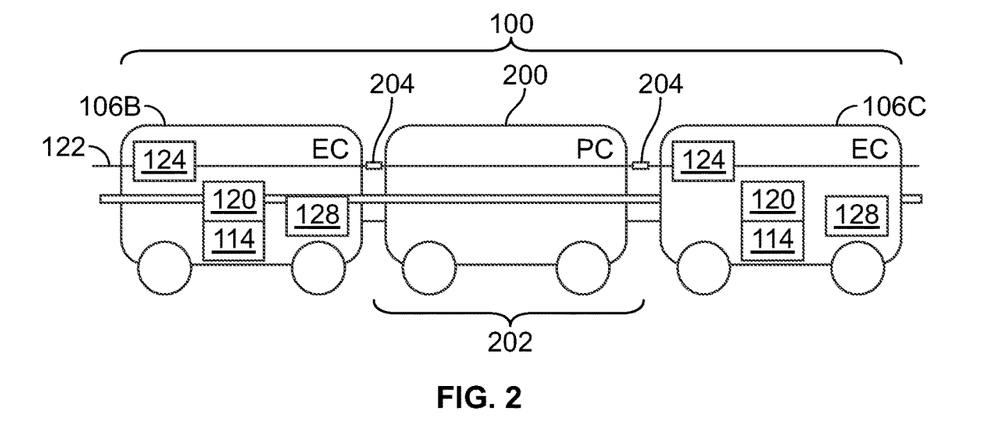
FIG. 2 illustrates an example of the braking system shown in FIG. 1 with an ECP bridge vehicle.

FIG. 2 illustrates an example of the braking system 100 shown in FIG. 1 with an ECP bridge vehicle 200. The ECP bridge vehicle can represent one or more of the vehicles in the vehicle system 102 shown in FIG. 1 that are not ECP equipped. Stated differently, the bridge vehicle can represent one or more of the vehicles 108, 110 that does not have the ECP control device 120 and/or one or more of the vehicles 104, 106 that has an ECP control device 120 that is deactivated, not working, or otherwise not in use.

The bridge vehicle operates as a connector between different portions of the ECP-equipped segment of the vehicle system. For example, although the bridge vehicle may not include the ECP control device, the bridge vehicle may include part of the cable through which the brake command signals and/or movement command signals are communicated so as to prevent interruption of these commands between ECP-equipped vehicles.

The bridge vehicle may be disposed between the vehicles 106B, 106C in the ECP-equipped segment of the vehicle system (or between other ECP-equipped vehicles). The bridge vehicle can include a bypass part or portion 202 of the cable 122 (e.g., the train line) or such that, while the bridge vehicle is coupled with the vehicles 106B, 106C in the ECP-equipped segment of the vehicle system, the command signals communicated via the cable are conducted through the bridge vehicle to one or more other vehicles. For example, the bypass portion can be a section of the cable having connectors 204 that couple with the cable 122 in the vehicle system. A brake command signal sent via the cable 122 from the lead ECP/WDP vehicle 104A (shown in FIG. 1) to the vehicle 106C can be conducted through the cable 122 to the ECP control device 120 in the vehicle 106A, then to the ECP control device in the vehicle 106B, then is conducted through the portion of the cable in the bridge vehicle (without being received or acted upon by any ECP control device within the bridge vehicle). The brake command signal is conducted through the portion of the cable in the bridge vehicle to the ECP control device in the vehicle 106C, and then to the vehicle 104B (and/or any other ECP-equipped vehicles that are downstream of the bridge vehicle along the direction of communication via the cable).

As another example, a throttle command signal (that directs a change in throttle setting of a propulsion-generating vehicle in the vehicle system) and/or dynamic braking command signal (that directs a vehicle to generate a braking effort using dynamic braking instead of air brakes) can be sent via the cable 122 from the lead ECP/WDP vehicle 104A to the vehicle 106C. These signals can be conducted through the cable 122 in the vehicle 106A, then through the cable 122 in the vehicle 106B, then through the cable in the bridge vehicle (without being received or acted upon by any device or controller within the bridge vehicle). The command signals can be conducted through the portion of the cable in the bridge vehicle to the controller in the vehicle 104B (and/or any other ECP-equipped vehicles that are downstream of the bridge vehicle along the direction of communication via the cable).

The bridge vehicle operates as a pass through of the command signals without having any device onboard the bridge vehicle receive the command signals and perform some action in response to receipt of the command signals. For example, the bridge vehicle does not engage or release a brake, change a throttle setting, change a dynamic braking effort, or the like. Instead, the bridge vehicle merely passes the command signals on to one or more other ECP-equipped vehicles in the same vehicle system.

The braking system described herein provides at least one path where a limited or partial ECP (PE)-enabled vehicle system and/or partial trainline distributed power (TLDP)-enabled can be used to improve operation of vehicle systems. The operation described herein can be used throughout a lengthy upgrade program with full ECP or ECP/WDP operation becoming available after entire vehicle systems have received the upgrade. The approach of starting with PE or TLDP operation initially will allow an operator or owner of vehicle systems to achieve levels of operational benefits much earlier in the upgrade program. An operator or the controller 126 of the vehicle system can select to drive the vehicle system in either PE or TLDP operation from the lead vehicle 104A, with the commands going from the lead vehicle 104A to the ECP-equipped vehicles 106 and the ECP/WDP equipped remote vehicles 104B via the ECP cable 122. The brake pipe 112 can be controlled in a conventional manner while in either PE or TLDP operation to guarantee that all vehicles properly and pneumatically respond to brake commands. The ECP control devices can be turned on so as to wake-up and allow communication among the ECP-equipped vehicles. The ECP control devices in the ECP-equipped vehicles in the ECP-equipped segment recognize that the PE mode is being commanded and provide pneumatic operation of the air brakes in the ECP-equipped vehicles. Any ECP-equipped vehicles that have been placed in the non-ECP equipped segment of the vehicle system can operate as a conventional or non-ECP vehicle with the ECP control devices remaining asleep or otherwise deactivated.

PE or TLDP operation in a vehicle system having both ECP-equipped vehicles and vehicles that are not ECP-equipped can provide for full pneumatic distributed power operation. The ECP-equipped vehicles in the ECP-equipped segment of the vehicle system are able to provide the pneumatic statuses (e.g., brake pipe pressure, brake cylinder pressure, reservoir pressure, etc.) and fault status to the lead vehicle 104A in real-time when in PE operation via the cable 122.

Once all of the vehicles have received the ECP/WDP upgrades, the vehicle system can be operated in full ECP or ECP/WDP mode, where the ECP control devices in the vehicles 106 and the controllers in the vehicles 104 receive signals via the cable 122 to control braking and throttle settings, respectively. Brake applications can now be commanded to the vehicles 106 via ECP messages, with the brake pipe remaining fully charged. Simultaneous braking and releases, continuous reservoir charging, and graduated release functionality can then be realized. The assessment of whether a vehicle system will operate in full ECP or ECP/WDP mode, or whether the vehicle system needs to remain in PE or PE/TLDP operation, can change from day-to-day as more vehicles receive ECP/WDP upgrades. Additionally, once the vehicle system is fully upgraded to ECP and ECP/WDP operation, the controller of the lead vehicle 104A can return to PE or PE/TLDP operation responsive to one or more faults in an ECP control device, the cable, etc.

Figure 3:
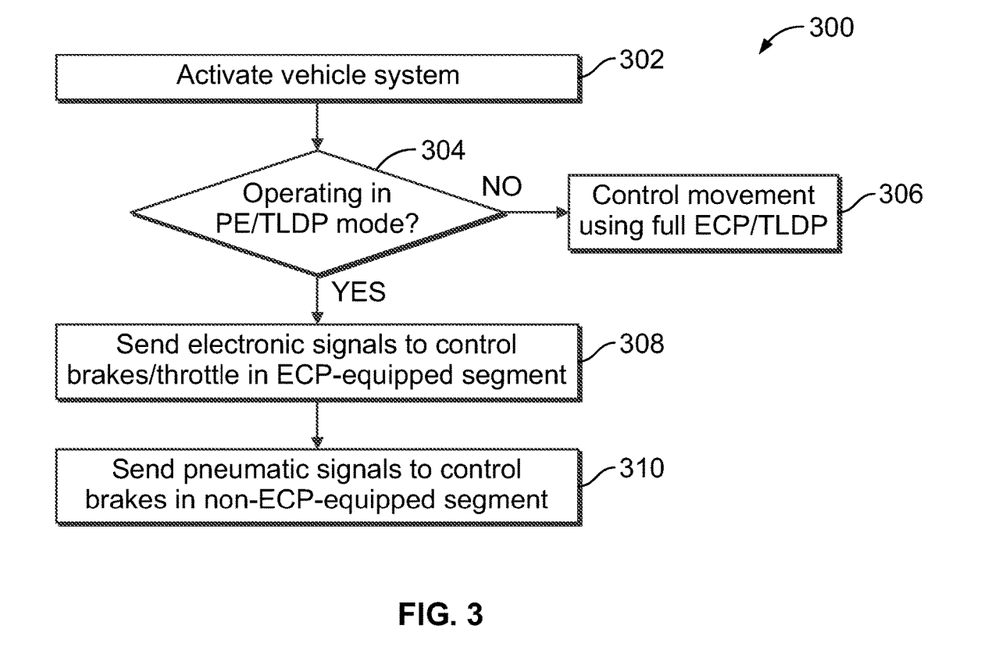
FIG. 3 illustrates a flowchart of one example of a method for controlling movement of a partially ECP-equipped vehicle system.

FIG. 3 illustrates a flowchart of one example of a method 300 for controlling movement of a partially ECP-equipped vehicle system. The method can represent operations performed by the controller 126 to control brakes and/or throttles of the vehicle system 102 shown in FIG. 1. Alternatively, the method can represent operations performed by another system.

At 302, the vehicle system is activated. The vehicle system can be activated by turning on or otherwise supplying power to the controllers, control devices, and the like, of the vehicle system. At 304, a determination is made as to whether the vehicle system is a fully or partially ECP-equipped vehicle system. For example, an operator can provide input to the controller of the lead vehicle that indicates whether the vehicle system is a partially ECP-equipped vehicle system. As another example, the controller can send a request signal to the ECP control devices of the vehicle system via the cable 122. The ECP control devices can send responsive signals to the controller. If the controller receives responses from an ECP control device onboard each vehicle in the vehicle system, then the controller determines that the vehicle system is fully ECP equipped. As a result, flow of the method can proceed toward 306. But, if the controller does not receive a response from an ECP control device onboard one or more vehicles in the vehicle system, then the controller determines that the vehicle system is partially ECP equipped. As a result, flow of the method can proceed toward 308.

At 306, movement of the fully ECP equipped vehicle system is controlled using commands electronically communicated via the cable. For example, brake command signals can be conducted along the train line to the ECP control devices onboard the cars and propulsion-generating vehicles in the vehicle system. Other movement command signals (e.g., throttle settings, dynamic brake settings, etc.) can be conducted along the train line to the controllers onboard the propulsion-generating vehicles in the vehicle system. Optionally, these other command signals may be communicated in another way, such as using wireless signals. This mode of controlling movement of the vehicle system can continue until the end of the trip of the vehicle system or until failure of the cable and/or an ECP control device (at which point flow of the method can return toward 304).

At 308 and 310, movement of the vehicle system is controlled by conducting electronic signals via the cable to the vehicle(s) in one segment of the vehicle system and by sending pneumatic signals via the brake pipe to the vehicle(s) in another segment of the vehicle system. For example, brake command signals can be conducted along the train line to the ECP control devices onboard the cars and propulsion-generating vehicles in the ECP-equipped segment of the vehicle system. As described above, these command signals can direct the ECP control devices to increase pressure in brake cylinders to engage the brakes (e.g., by closing exhausts of the brake cylinders and directing air from reservoirs on the vehicles into the brake cylinders). The command signals can direct the ECP control devices to exhaust the pressure in brake cylinders to release the brakes (e.g., by opening exhausts of the brake cylinders). Other movement command signals can be conducted along the train line to the controllers onboard the propulsion-generating vehicles in the ECP-equipped segment of the vehicle system. This segment may be the front or leading portion or end of the vehicle system.

For the vehicles of the vehicle system that are not in the ECP-equipped segment, the brakes can be controlled by decreasing or increasing pressure in the brake pipe. The controller in the lead vehicle in the ECP-equipped segment can send a brake command signal to a remote vehicle in the ECP-equipped segment (e.g., the last propulsion-generating vehicle in the ECP-equipped segment along a direction of movement of the vehicle system). This remote vehicle can then initiate a change in the pressure in the brake pipe. This change in pressure propagates along the length of the brake pipe in the non-ECP-equipped segment and engages or releases the brakes as the pressure change propagates along the length of the brake pipe. The electronic signals and the pressure change propagation can be sent concurrently so that brakes in both the ECP-equipped segment and the non-ECP-equipped segment are engaged or released at the same time. Flow of the method can then terminate or return toward 304 or another operation.

In one embodiment, a method includes conducting an electronic command signal via a cable extending through multiple first vehicles in a first segment of a multi-vehicle system. The electronic command signal directs engagement or release of an air brake coupled to a brake pipe that extends along a length of the multi-vehicle system. The method also can include pneumatically communicating a pneumatic command signal via the brake pipe to one or more second vehicles in a second segment of the multi-vehicle system. The pneumatic command signal directs one or more of the engagement or the release of the air brake coupled to the brake pipe in the one or more second vehicles.

Optionally, the first segment of the multi-vehicle system can be an ECP-equipped segment of the multi-vehicle system and the second segment of the multi-vehicle system is a non-ECP-equipped segment of the multi-vehicle system. Each of the first vehicles in the ECP-equipped segment of the multi-vehicle system can have an ECP control device that, responsive to receiving the electronic command signal, changes an air pressure in brake cylinders of the air brakes in the first vehicles to engage or release the air brakes. The second vehicles in the non-ECP-equipped segment of the multi-vehicle system may not have the ECP control device in one embodiment. At least one of the second vehicles can include the ECP control device, and the method also can include activating the ECP control devices in the first vehicles prior to initiating movement of the multi-vehicle system, where the ECP control device in the at least one of the second vehicles remains deactivated after the ECP control devices in the first vehicles are activated.

Optionally, the electronic command signal can be conducted via the cable and the pneumatic command signal is pneumatically communicated via the brake pipe to coordinate concurrent engagement of the air brakes of the second vehicles in the second segment and at least one of the first vehicles in the first segment. The electronic command signal can be a brake command signal, and the method also can include conducting a second electronic command signal via the cable extending through the first vehicles in the first segment of the multi-vehicle system. The second electronic command signal can direct a change in a throttle setting of a propulsion-generating vehicle in the first vehicles.

The electronic command signal can be a brake command signal, and the method also can include conducting a second electronic command signal via the cable extending through the first vehicles in the first segment of the multi-vehicle system. The second electronic command signal can direct a change in a dynamic brake setting of a propulsion-generating vehicle in the first vehicles.

The first segment can be disposed at a leading end of the multi-vehicle system and the second segment can be disposed at a trailing end of the multi-vehicle system. The method also may include communicating one or more of a status of the air brake or sensor information from at least one of the first vehicles via an electronic status signal sent via the cable in the first segment of the multi-vehicle system. The method optionally can include remotely changing a state of a hand brake in at least one of the first vehicles by communicating an electronic handbrake signal via the cable in the first segment of the multi-vehicle system.

In one embodiment, a braking system includes a brake pipe configured to fluidly couple air brakes disposed onboard first vehicles and second vehicles in a multi-vehicle system. The first vehicles are in a first segment and the second vehicles are in a second segment of the multi-vehicle system. The braking system also can include a cable extending through the first vehicles in the first segment of the multi-vehicle system and ECP control devices configured to be disposed onboard one or more of the first vehicles and to control operation of the air brake of the one or more of the first vehicles. The ECP control devices are configured to receive an electronic command signal conducted along the cable that directs engagement or release of the air brake in at least one of the first vehicles. The brake pipe is configured to pneumatically communicate a pneumatic command signal to the second vehicles that directs the engagement or the release of the air brake in the second vehicles.

Optionally, the first segment of the multi-vehicle system can be an ECP-equipped segment of the multi-vehicle system and the second segment of the multi-vehicle system can be a non-ECP-equipped segment of the multi-vehicle system. The ECP control devices can be configured to change an air pressure in brake cylinders of the air brakes in the first vehicles to engage or release the air brakes responsive to receiving the electronic command signal. The second vehicles in the non-ECP-equipped segment of the multi-vehicle system may not have the ECP control device in one embodiment. At least one of the second vehicles can include at least one of the ECP control devices. The ECP control devices in the first vehicles can be configured to be activated prior to initiating movement of the multi-vehicle system with the at least one of the ECP control devices in the at least one of the second vehicles remaining deactivated after the ECP control devices in the first vehicles are activated.

The cable can be configured to conduct the electronic command signal and the brake pipe is configured to concurrently communicate the pneumatic command signal to coordinate concurrent engagement of the air brakes of the second vehicles in the second segment and at least one of the first vehicles in the first segment. The electronic command signal can be a brake command signal, and the cable also can be configured to conduct a second electronic command signal that directs a change in a throttle setting of a propulsion-generating vehicle in the first vehicles.

The electronic command signal can be a brake command signal, and the cable can be configured to conduct a second electronic command signal to direct a change in a dynamic brake setting of a propulsion-generating vehicle in the first vehicles. The first segment can be disposed at a leading end of the multi-vehicle system and the second segment can be disposed at a trailing end of the multi-vehicle system. The cable can be configured to conduct a status signal representing one or more of a status of the air brake or sensor information from at least one of the first vehicles. The cable can be configured to conduct an electronic handbrake signal to remotely change a state of a hand brake in at least one of the first vehicles.

In one embodiment, a vehicle system includes first vehicles having ECP control devices conductively coupled with each other by a cable. The first vehicles also have air brakes fluidly coupled with a brake pipe. The vehicle system includes second vehicles not having the ECP control devices. The second vehicles have the air brakes that are fluidly coupled with the brake pipe. The ECP control devices in the first vehicles are configured to receive an electronic command signal conducted along the cable that directs engagement or release of the air brakes in the first vehicles. The brake pipe is configured to pneumatically communicate a pneumatic command signal to the second vehicles that directs the engagement or the release of the air brakes in the second vehicles.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method for controlling air brakes in a vehicle system formed from vehicles in a first segment and a second segment with a brake pipe extending through the vehicles in the first segment and the second segment, the vehicles in the first segment including a lead vehicle and a remote vehicle, the vehicles in the first segment equipped with electronically controlled pneumatic (ECP) devices that use electronic signals to actuate the air brakes onboard the vehicles in the first segment, the vehicles in the second segment including a first vehicle that is adjacent to the remote vehicle in the first segment, the vehicles in the second segment including the air brakes that are not actuated using the electronic signals, the method comprising:

conducting the electronic signals from the lead vehicle to the ECP devices onboard the vehicles in the first segment via a cable extending through the vehicles in the first segment, the electronic signals directing engagement or release of the air brakes onboard the vehicles in the first segment, wherein the electronic signals conducted to the ECP device onboard the remote vehicle in the first segment from the lead vehicle creates a pressure reduction in the brake pipe in the first vehicle in the second segment that is adjacent to the remote vehicle in the first segment; and pneumatically communicating a pneumatic command signal via the brake pipe to the air brakes onboard the vehicles in the second segment, the pneumatic command signal created by the pressure reduction in the brake pipe in the first vehicle in the second segment that is adjacent to the remote vehicle in the first segment caused by the electronic signals conducted to the ECP device onboard the remote vehicle in the first segment, the pneumatic command signal pneumatically conveyed to the air brakes onboard the vehicles in the second segment via the brake pipe to actuate the air brakes onboard the vehicles in the second segment.

2. The method of claim 1, wherein the electronic signals are conducted via the cable and the pneumatic command signal is pneumatically communicated via the brake pipe to coordinate concurrent engagement of the air brakes of the vehicles in the first segment with the air brakes of the vehicles in the second segment.

3. The method of claim 1, wherein the electronic signals are brake command signals, and further comprising:
conducting additional electronic command signals via the cable extending through the vehicles in the first segment, the additional electronic command signal directing a change in a throttle setting of a propulsion-generating vehicle in the vehicles in the first segment.

4. The method of claim 1, wherein the electronic signals are brake command signals, and further comprising:
conducting additional electronic command signals via the cable extending through the vehicles in the first segment, the additional electronic command signals directing a change in a dynamic brake setting of a propulsion-generating vehicle in the vehicles in the first segment.

5. The method of claim 1, further comprising:
communicating one or more of a status of at least one of the air brakes or sensor information from at least one of the vehicles in the first segment via an electronic status signal sent via the cable in the first segment.

6. The method of claim 1, further comprising:
remotely changing a state of a hand brake in at least one of the vehicles in the first segment by communicating an electronic handbrake signal via the cable in the first segment.

7. A braking system onboard a vehicle system having vehicles in a first segment and a second segment, the vehicles in the first segment including a lead vehicle and a remote vehicle, the vehicles in the second segment including a first vehicle that is adjacent to the remote vehicle in the first segment, the braking system comprising:
a brake pipe configured to fluidly couple air brakes disposed onboard the vehicles in the first segment and in the second segment;
a cable extending through the first vehicles in the first segment; and
electronically controlled pneumatic (ECP) control devices configured to be disposed onboard the vehicles in the first segment, the ECP control devices configured to control operation of the air brakes onboard the vehicles in the first segment,
the ECP control devices configured to receive an electronic command signal conducted along the cable that actuates the brakes in the vehicles in the first segment, wherein the air brakes in the vehicles in the second segment are not actuated by electronic signals,
the ECP control device onboard the remote vehicle in the first segment configured to receive the electronic command signal and create a reduction in air pressure in the brake pipe in the first vehicle in the second segment that is adjacent to the remote vehicle, the brake pipe configured to pneumatically communicate the reduction in the air pressure as a pneumatic command signal to the air brakes onboard the vehicles in the second segment that actuates the air brake in the vehicles in the second segment.

8. The braking system of claim 7, wherein the cable is configured to conduct the electronic command signal and the brake pipe is configured to concurrently communicate the pneumatic command signal to coordinate concurrent engagement of the air brakes of the vehicles in the first segment with the air brakes of the vehicles in the first segment.

9. The braking system of claim 7, wherein the electronic command signal is a brake command signal, and the cable is configured to conduct a second electronic command signal to direct a change in a dynamic brake setting of a propulsion-generating vehicle of the vehicles in the first segment.

10. The braking system of claim 7, wherein the vehicles in the first segment are disposed at a leading end of the vehicle system and the vehicles in the second segment are disposed at a trailing end of the vehicle system.

11. The braking system of claim 7, wherein the cable is configured to conduct an electronic handbrake signal to remotely change a state of a hand brake in at least one of the vehicles in the first segment.

12. The braking system of claim 7, wherein at least one of the vehicles in the first segment includes a bypass cable portion that couples with the cable extending through the vehicles in the first segment to conduct the electronic command signal through the at least one of the vehicles in the first segment.

13. The braking system of claim 7, wherein the vehicles in the second segment are located farther from a leading end of the vehicle system than the ECP control devices onboard the vehicles in the first segment.

14. A vehicle system comprising:
vehicles in a first segment and a second segment, the vehicles in the first segment having electronically controlled pneumatic (ECP) control devices conductively coupled with each other by a cable, the vehicles in the first segment also having air brakes fluidly coupled with a brake pipe, the vehicles in the first segment including a lead vehicle and a remote vehicle, the ECP control devices configured to receive electronic signals to control actuation of the air brakes in the vehicles in the first segment;
the vehicles in the second segment not having the ECP control devices but having the air brakes that are fluidly coupled with the brake pipe, the air brakes of the vehicles in the second segment not directly controlled with the electronic signals; and
a controller onboard the lead vehicle and configured to send the electronic signals to the ECP control devices in the first vehicles in the first segment, to actuate the air brakes in the vehicles in the first segment using the ECP control devices,
the controller configured to actuate the air brakes in the vehicles in the second segment by sending at least one of the electronic signals to the ECP control device onboard the remote vehicle in the first segment to reduce an air pressure in the brake pipe in the remote vehicle and create a reduction in the air pressure in the brake pipe in a first vehicle in the second segment that is adjacent to the remote vehicle in the first segment, the reduction in the air pressure pneumatically communicated to the air brakes of the vehicles in the second segment and actuating the air brakes in the vehicles of the second segment.

15. The vehicle system of claim 14, wherein the vehicles in the first segment are located farther from a leading end of the vehicle system than the vehicles in the second segment.

* * * * *